United States Patent
Huang et al.

(10) Patent No.: US 12,028,734 B2
(45) Date of Patent: Jul. 2, 2024

(54) MEASUREMENT REPORTING METHOD AND APPARATUS

(71) Applicant: Huawei Technologies Co., Ltd., Shenzhen (CN)

(72) Inventors: Su Huang, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 295 days.

(21) Appl. No.: 17/693,082

(22) Filed: Mar. 11, 2022

(65) Prior Publication Data

US 2022/0201531 A1    Jun. 23, 2022

Related U.S. Application Data (63) Continuation of application No. PCT/CN2019/105776, filed on Sep. 12, 2019.

(51) Int. Cl.
*H04W 24/10* (2009.01)
*H04L 5/00* (2006.01)
*H04W 4/02* (2018.01)
*H04W 64/00* (2009.01)

(52) U.S. Cl.
CPC ........... *H04W 24/10* (2013.01); *H04L 5/0051* (2013.01); *H04W 4/027* (2013.01); *H04W 64/006* (2013.01)

(58) Field of Classification Search
CPC ... H04W 24/10; H04W 4/027; H04W 64/006; H04L 5/0051
See application file for complete search history.

(56) References Cited

U.S. PATENT DOCUMENTS

| | | | |
|---|---|---|---|
| 2015/0230112 A1 | 8/2015 | Siomina et al. | |
| 2017/0289831 A1 | 10/2017 | Park et al. | |
| 2018/0139763 A1 | 5/2018 | Bitra et al. | |
| 2018/0146332 A1 | 5/2018 | Opshaug et al. | |
| 2018/0302873 A1* | 10/2018 | Kazmi | H04W 24/10 |
| 2019/0174466 A1 | 6/2019 | Zhang et al. | |

FOREIGN PATENT DOCUMENTS

| | | |
|---|---|---|
| CN | 103200610 A | 7/2013 |
| CN | 105589506 A | 5/2016 |
| CN | 107846697 A | 3/2018 |
| CN | 109964141 A | 7/2019 |
| WO | 2014146530 A1 | 9/2014 |

* cited by examiner

*Primary Examiner* — Curtis B Odom
(74) *Attorney, Agent, or Firm* — Leydig, Voit & Mayer, Ltd.

(57) ABSTRACT

Disclosed are a measurement reporting method and apparatus, to resolve a problem that information about a measurement quantity change in a reporting periodicity is lost during measurement reporting in a current technology. The method includes: In a measurement reporting periodicity, a first communication device receives N reference signals sent by a second communication device in N reference signal periodicities, and measures the N reference signals to obtain M measurement values. The first communication device reports a measurement report of M measurement results to a positioning device, where N is an integer greater than 1, and M is less than or equal to N. The first communication device may be a terminal, and the second communication device is a base station. Alternatively, the first communication device may be a base station, and the second communication device is a terminal.

20 Claims, 4 Drawing Sheets

MEASUREMENT REPORTING METHOD AND APPARATUS

CROSS-REFERENCE TO RELATED APPLICATIONS

This application is a continuation of International Application No. PCT/CN2019/105776, filed on Sep. 12, 2019, the disclosure of which is hereby incorporated by reference in its entirety.

TECHNICAL FIELD

This application relates to the field of communication technologies, and in particular, to a measurement reporting method and apparatus.

BACKGROUND

In conventional cellular network positioning, a terminal measures a downlink reference signal, or a base station measures an uplink reference signal, and reports a measurement result to a positioning server. The positioning server determines a position of the terminal based on the measurement result and a position of the base station.

Currently, a measurement reporting process of the terminal or the base station is generally physical layer measurement and upper layer reporting. After performing physical layer measurement on periodic reference signals, a physical layer combines, through filtering, values corresponding to a plurality of physical layer measurement quantities into one value and reports the value to an upper layer. After receiving the physical layer reporting, the upper layer performs layer 3 filtering, and feeds back a result of layer 3 filtering to the positioning server as an upper-layer reported quantity. For example, the measurement quantities are a time of arrival (TOA), a reference signal time difference (RSTD), a terminal reference signal receive–reference signal transmit time difference (UE Rx–Tx time difference); or the positioning information request message includes one or more of the following measurement quantities: an uplink relative time of arrival (UL-RTOA), a base station reference signal receive–reference signal transmit time difference (gNB Rx–Tx time difference), and an azimuth/zenith angle of arrival (AoA/ZoA).

However, in a process in which the terminal moves, a value (which may be referred to as a measurement value) corresponding to a measurement quantity measured by the terminal may change with the position. In a manner of outputting a single value through filtering, a change of the measurement value is smoothed out, and information about the change of the measurement quantity in a reporting periodicity is lost. Similarly, when the terminal moves or a timing advance (TA) of the terminal changes, sending an uplink reference signal causes a change in a time at which the uplink reference signal arrives at the base station. As a result, a measurement value changes. However, in the manner of outputting a single value through filtering, the change of the measurement value is smoothed out. As a result, information about the change of the measurement value in a reporting periodicity is lost.

SUMMARY

Embodiments of this application provide a measurement reporting method and apparatus, to resolve a problem that information about a measurement value change in a reporting periodicity is lost during measurement reporting in a current technology.

According to a first aspect, an embodiment of this application provides a measurement reporting method. The method includes: In a measurement reporting periodicity, a first communication device receives N reference signals sent by a second communication device in N reference signal periodicities, where N is an integer greater than 1. The first communication device measures the N reference signals in the measurement reporting periodicity to obtain M measurement values, and reports a measurement report including the M measurement values to a positioning device, where M is less than or equal to N. In this embodiment of this application, the first communication device adds a plurality of measurement results to a single report, so that the positioning device can determine a measurement value change status in a reporting periodicity, thereby improving accuracy of terminal positioning.

In a possible implementation, the first communication device may be a terminal, and the second communication device may be a base station. Alternatively, the first communication device may be a base station, and the second communication device is a terminal.

In a possible implementation, before the first communication device measures the N reference signals, the first communication device may receive a positioning information request message. The positioning information request message includes one or more of the following measurement quantities: a time of arrival (TOA), a reference signal time difference (RSTD), a terminal reference signal receive–reference signal transmit time difference (UE Rx–Tx time difference): or the positioning information request message includes one or more of the following measurement quantities: an uplink relative time of arrival (UL-RTOA), a base station reference signal receive–reference signal transmit time difference (gNB Rx–Tx time difference), and an azimuth/zenith angle of arrival (AoA/ZoA). In the foregoing manner, the positioning device indicates a measurement quantity to be reported by the first communication device, so that the positioning device and the first communication device can align their understanding of a measurement result, thereby improving accuracy of terminal positioning. In addition, the positioning device indicates a type of a measurement quantity, so that flexibility of terminal positioning may be improved.

In a possible implementation, the positioning information request message may include a value of M. In the foregoing implementation, the positioning device may indicate the terminal or the base station to report a quantity of measurement results, so that flexibility of terminal positioning may be improved.

In a possible implementation, an $i^{th}$ measurement result may be an $i^{th}$ measurement value in the M measurement values; or an $i^{th}$ measurement result may be a change of an $i^{th}$ measurement value in the M measurement values relative to a first measurement value; or an $i^{th}$ measurement result may be a change of an $i^{th}$ measurement value in the M measurement values relative to an $(i-1)^{th}$ measurement value; or an $i^{th}$ measurement result may be a change of the $i^{th}$ measurement value in the M measurement values relative to an $M^{th}$ measurement value, where i is greater than 1 and less than or equal to M. According to the foregoing design, a measurement value change status in a measurement reporting periodicity may be better retained in the measurement report, so that accuracy of terminal positioning may be improved.

In a possible implementation, the measurement report may further include: N timestamps of the N reference signals received by the first communication device. In the foregoing manner, the timestamps are reported, so that the positioning device can estimate a speed of the terminal, thereby more accurately obtaining position information of the terminal.

In a possible implementation, the timestamps may be in one of the following types: sequence numbers of the reference signal periodicities; or system frame numbers (SFNs) corresponding to the reference signal periodicities; or SFNs corresponding to the reference signal periodicities and subframe numbers of subframes in which the reference signals are located; or SFNs corresponding to the reference signal periodicities and timeslot numbers of timeslots in which the reference signals are located.

In a possible implementation, the positioning information request message may further indicate a type of a timestamp.

In any one of the first aspect or the possible implementations of the first aspect, the reference signal is a sounding reference signal (SRS) or a positioning reference signal (PRS).

According to a second aspect, this application provides a measurement reporting apparatus. The apparatus may be a communication device, or may be a chip or a chip set in a communication device. The apparatus may include a processing unit and a transceiver unit. When the apparatus is a communication device, the processing unit may be a processor, and the transceiver unit may be a transceiver. The apparatus may further include a storage module, and the storage module may be a memory. The storage module is configured to store instructions, and the processing unit executes the instructions stored in the storage module, so that the communication device performs a corresponding function in the first aspect. When the apparatus is a chip or a chip set in a communication device, the processing unit may be a processor, and the transceiver unit may be an input/output interface, a pin, a circuit, or the like. The processing unit executes instructions stored in a storage module, so that the communication device performs a corresponding function in the first aspect. The storage module may be a storage module (for example, a register or a cache) in the chip or the chip set, or may be a storage module (for example, a read-only memory or a random access memory) that is in the network device and that is located outside the chip or the chip set.

According to a third aspect, a measurement reporting apparatus is provided, including a processor, a communication interface, and a memory. The communication interface is configured to transmit information, and/or a message, and/or data between the apparatus and another apparatus. The memory is configured to store computer execution instructions. When the apparatus runs, the processor executes the computer execution instructions stored in the memory, so that the apparatus performs the measurement reporting method according to any one of the first aspect or the implementations of the first aspect.

According to a fourth aspect, this application further provides a computer-readable storage medium. The computer-readable storage medium stores instructions. When the instructions run on a computer, the computer is enabled to perform the measurement reporting method according to any one of the first aspect or the implementations of the first aspect.

According to a fifth aspect, this application further provides a computer program product including instructions. When the instructions run on a computer, the computer is enabled to perform the measurement reporting method according to any one of the first aspect or the implementations of the first aspect.

According to a sixth aspect, this application further provides a network system. The network system includes a first communication device, a second communication device, and a positioning device. The first communication device is the apparatus according to the second aspect or the third aspect.

DESCRIPTION OF EMBODIMENTS

To facilitate understanding of embodiments of this application, the following describes terms related to embodiments of this application.

1. RSTD: is a time difference between a time at which a reference signal sent by a neighboring cell arrives at a terminal and a time at which a reference signal sent by a reference cell arrives at the terminal. The RSTD may be used for a location based service.

2. UL-RTOA: is a time difference between a time at which a reference signal sent by a terminal arrives at a base station and a reference time point.

3. UE Rx–Tx time difference: is a time difference between a time point at which a terminal receives a PRS and a time point at which the terminal sends an SRS.

4. gNB Rx–Tx time difference: is a time difference between a time point at which a base station receives an SRS and a time point at which the base station sends a PRS.

5. Reference cell: may be an explicitly specified reference cell, or may be a cell that includes a reference positioning reference signal resource set, or may be a cell that sends a reference positioning reference signal.

6. Neighboring cell: may be a cell other than a reference cell. If the reference cell is not a serving cell of a terminal, the serving cell of the terminal may also be considered as a neighboring cell. A neighboring cell may also be understood as a non-reference cell.

To make objectives, technical solutions, and advantages of this application clearer, the following further describes this application in detail with reference to the accompanying drawings.

A measurement reporting method provided in this application may be applied to various communication systems, for example, an Internet of Things (IOT) system, a narrow band Internet of Things (NB-IOT) system, a long term evolution (LTE) system, a $5^{th}$ generation (5G) communication system, an LTE and 5G hybrid architecture, a 5G new radio (NR) system, and a new communication system emerging in future communication development.

Figure 1:
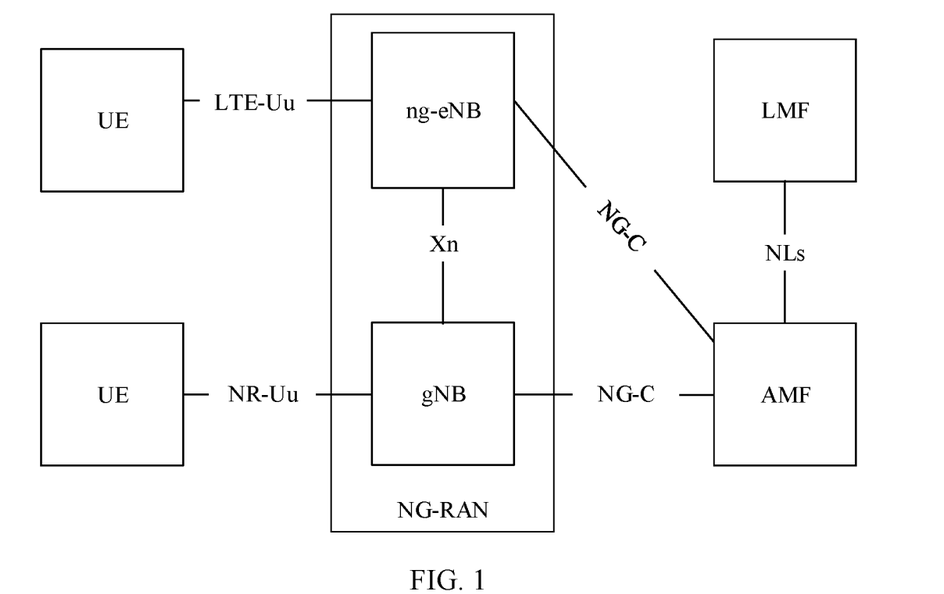
FIG. 1 is a schematic diagram of an architecture of a communication system according to this application.

For example, FIG. 1 is a schematic diagram of an architecture of a communication system to which this application is applicable. The communication system may include a core network, a radio access network (next-generation radio access network, NG-RAN), and a terminal. The core network may include functions such as an access and mobility management function (AMF) and a location management function (LMF). The AMF may implement functions such as a gateway, and the LMF may implement functions such as a positioning center. Certainly, the core network may further include other network elements, which are not listed one by one herein. The AMF and the LMF may be connected by using an NLs interface. The NG-RAN may include one or more network devices. The network device may be but is not limited to an ng-eNB, a gNB, or the like. The ng-eNB is an LTE base station that accesses a 5G core network, and the gNB is a 5G base station that accesses the 5G core network. The terminal includes one or more pieces of a user equipment (UE). The radio access network may be connected to the core network by using an NG-C interface and the AMF, and the terminal is connected to the radio access network by using LTE-Uu and the ng-eNB, or may be connected to the radio access network by using NR-Uu, the ng-eNB, and the gNB.

Figure 2:
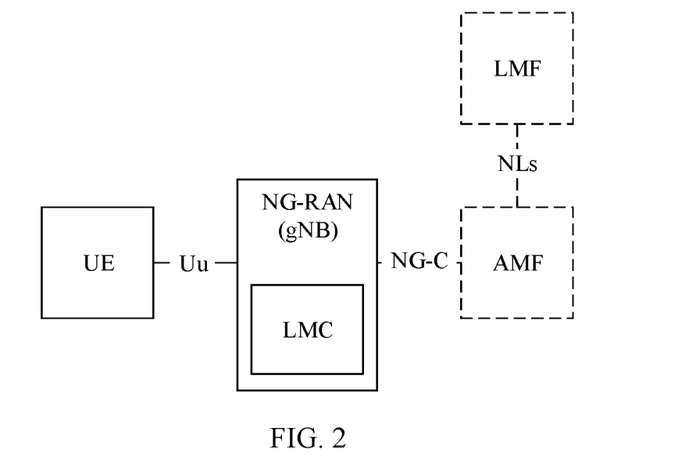
FIG. 2 is a schematic diagram of an architecture of another communication system according to this application.

FIG. 2 is a schematic diagram of an architecture of another communication system to which this application is applicable. A network device in the communication system may include a location management component (LMC). The LMC may implement some functions of the LMF, so that the 5G core network does not need to be introduced by using the AMF.

It should be understood that FIG. 1 and FIG. 2 are merely examples for description, and do not specifically limit a type, a quantity, a connection manner, and the like of network elements included in a communication system to which this application is applicable.

The LMF in embodiments of this application is an apparatus or a component deployed in a core network to provide a positioning function for UE.

The LMC in embodiments of this application is a function component of the LMF, and may be integrated into a gNB on an NG-RAN side.

The terminal in embodiments of this application is an entity that is on a user side and that is configured to receive or transmit a signal. The terminal may be a device that provides a user with voice and/or data connectivity, for example, a handheld device or a vehicle-mounted device having a wireless connection function. The terminal may alternatively be another processing device connected to a wireless modem. The terminal may communicate with one or more core networks via a radio access network (RAN). The terminal may also be referred to as a wireless terminal, a subscriber unit, a subscriber station, a mobile station, a mobile, a remote station, an access point, a remote terminal, an access terminal, a user terminal, a user agent, a user device, a user equipment, or the like. The terminal may be a mobile terminal, for example, a mobile phone (or also referred to as a cellular phone), and a computer that has a mobile terminal. For example, the terminal may be a portable, pocket-size, handheld, computer-integrated or vehicle-mounted mobile apparatus, which exchanges languages and/or data with the wireless access network. For example, the terminal may alternatively be a device such as a personal communications service (PCS) phone, a cordless telephone set, a session initiation protocol (SIP) phone, a wireless local loop (WLL) station, or a personal digital assistant (PDA). For example, common terminals include a mobile phone, a tablet computer, a notebook computer, a palmtop computer, a mobile internet device (MID), and a wearable device such as a smartwatch, a smart band, or a pedometer. However, embodiments of this application are not limited thereto.

The network device in embodiments of this application is an entity that is on a network side and that is configured to transmit and/or receive a signal, and may be configured to perform mutual conversion between a received over-the-air frame and an Internet protocol (IP) packet, and serve as a router between a terminal and a rest part of an access network. The rest part of the access network may include an IP network or the like. The network device may further coordinate attribute management of an air interface. For example, the network device may be an evolved NodeB (evolutional Node B, or eNB, or e-NodeB) in LTE. The eNB is an apparatus that is deployed in a radio access network and that meets a 4G standard and provides a wireless communication function for UE. The network device may alternatively be a new radio controller (NR controller), a gNodeB (gNB) in a 5G system, a centralized unit, a new radio base station, a radio remote module, a micro base station (also referred to as a small cell), a relay, a distributed unit, a macro base station in various forms, a transmission reception point (TRP), a transmission measurement function (TMF), a transmission point (TP), any other radio access device, or a base station in next generation communication. However, embodiments of this application are not limited thereto.

In conventional cellular network positioning, a terminal measures a downlink reference signal (for example, a positioning reference signal (PRS)), or a base station measures an uplink reference signal (for example, a sounding reference signal (SRS)), and reports a measurement result to a positioning server. The positioning server determines a position of the terminal based on the measurement result and a position of the base station.

For downlink time difference of arrival (DL-TDOA) or observed time difference of arrival (OTDOA) positioning, the terminal measures an RSTD of a downlink reference signal PRS, and reports the RSTD to the positioning server.

For uplink time difference of arrival (UL-TDOA or UTDOA) positioning, the base station measures a UL-RTOA of an uplink reference signal SRS, and reports the UL-RTOA to the positioning server.

For multi-cell round trip time (RTT) positioning, the terminal measures a UE Rx–Tx time difference of a PRS, the base station measures a gNB Rx–Tx time difference of an SRS, and the UE Rx–Tx time difference and the gNB Rx–Tx time difference are separately reported to the positioning server. Therefore, the positioning server may determine a round trip time between the terminal and the base station based on the UE Rx–Tx time difference and the gNB Rx–Tx time difference, to determine the position of the terminal based on the round trip time.

Figure 3:
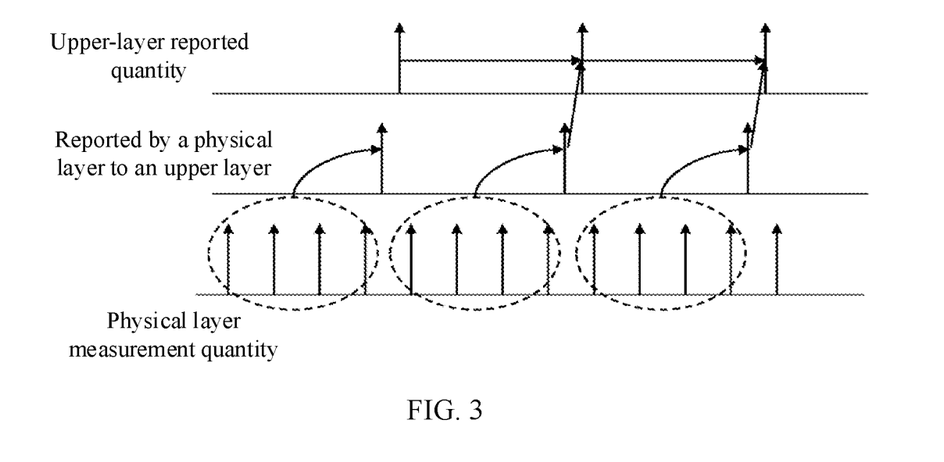
FIG. 3 is a schematic diagram of filtering according to this application.

Currently, a measurement reporting process of the terminal or the base station is generally physical layer measurement and upper layer reporting. After performing physical layer measurement on periodic reference signals, a physical layer combines, through filtering, measurement values corresponding to a plurality of physical layer measurement quantities into one measurement value and reports the measurement value to an upper layer. After receiving the physical layer reporting, the upper layer performs layer 3 filtering, and feeds back a result of layer 3 filtering to the positioning server as an upper-layer reported quantity, as shown in FIG. 3.

Generally, downlink is used as an example. The terminal performs physical layer measurement on periodically sent physical layer reference signals, and combines values corresponding to a plurality of physical layer measurement quantities into one measurement, and a physical layer of the terminal reports the measurement to an upper layer of the terminal. After receiving the physical layer reporting, the upper layer of the terminal performs layer 3 filtering. For example, a first-order infinite impulse response (IIR) filter in a form such as $F_n=(1-a)*F_{n-1}+a*M_n$ may be used to smooth a historical filtering result and a latest measurement value reported by the physical layer. Herein, a may be equal to $1/2^{(ki/4)}$, where ki is a positive number. The upper layer of the terminal feeds back a result of layer 3 filtering to the positioning server as an upper-layer reported quantity.

In LTE, an OTDOA terminal measures an RSTD based on a PRS, a PRS periodicity may be 5 ms, 10 ms, 20 ms, 40 ms, 80 ms, 160 ms, 320 ms, 640 ms, or 1280 ms, and an OTDOA reporting periodicity may be set to 0.25 s, 0.5 s, 1 s, 2 s, 4 s, 8 s, 10 s, 16 s, 20 s, 32 s, or 64 s. It may be learned that, for a cell, the terminal performs PRS measurement for a plurality of times in one OTDOA reporting periodicity, to obtain a plurality of RSTDs. For example, when the PRS periodicity is 10 ms, and the OTDOA reporting periodicity is 0.5 s, the terminal performs PRS measurement for 50 times in one OTDOA reporting periodicity, to obtain 50 RSTDs. However, in each OTDOA reporting periodicity, the terminal reports only one RSTD for the cell.

However, in a process in which the terminal moves, the RSTD measured by the terminal may change with the position. In a manner of outputting a single value through filtering, a change of the RSTD is smoothed out, and information about the change of the RSTD in a reporting periodicity is lost.

In LTE, a UTDOA location management unit (LMU) measures a UL-RTOA based on an SRS, and an SRS periodicity may be 2 ms, 5 ms, 10 ms, 20 ms, 40 ms, 80 ms, 160 ms, or 320 ms. During UTDOA reporting, based on configured SRS bandwidth, a UL-RTOA that meets a specific precision requirement needs to be reported for every M SRS periodicities, as shown in Table 1. A single UE on which the LMU receives a single carrier is used as an example. A minimum number of SRS transmissions corresponds to a minimum value of M. For example, when the SRS bandwidth is 60 RBs, the LMU needs to obtain a UL-RTOA with required precision of 6 Ts every five times of measurement, and report the UL-RTOA to a positioning center. Similarly, during each time of reporting, the LMU reports only one UL-RTOA for each uplink carrier of a UE.

TABLE 1

| SRS bandwidth (RBs) | AWGN | | EPA5 | | ETU30 | |
|---|---|---|---|---|---|---|
| | Minimum number of SRS transmissions | 90% RTOA (Ts) | Minimum number of SRS transmissions | 90% RTOA (Ts) | Minimum number of SRS transmissions | 90% RTOA (Ts) |
| 4 | 233 | 10 | 250 | 10 | 421 | 16 |
| 8 | 71 | 8 | 77 | 10 | 127 | 14 |
| 12 | 37 | 8 | 42 | 8 | 90 | 14 |
| 16 | 24 | 8 | 29 | 10 | 63 | 12 |
| 20 | 17 | 8 | 22 | 8 | 52 | 12 |
| 24 | 14 | 8 | 18 | 8 | 44 | 12 |
| 32 | 9 | 8 | 13 | 8 | 35 | 12 |
| 36 | 8 | 6 | 12 | 8 | 32 | 12 |
| 40 | 7 | 6 | 10 | 8 | 29 | 12 |
| 48 | 5 | 6 | 9 | 8 | 25 | 12 |
| 60 | 5 | 6 | 7 | 8 | 20 | 14 |
| 64 | 4 | 6 | 7 | 8 | 18 | 14 |
| 72 | 4 | 6 | 6 | 8 | 17 | 14 |
| 80 | 3 | 6 | 6 | 8 | 15 | 14 |
| 96 | 3 | 6 | 5 | 8 | 13 | 14 |

Additive white Gaussian noise (AWGN), EPA5, and ETU30 are channel models, SRS bandwidth is bandwidth of an SRS, Minimum number of SRS transmissions is a quantity of SRSs transmitted during UTDOA reporting, and 90% RTOA is precision of a reported UL-RTOA.

When the terminal moves or a timing advance (TA) of the terminal changes, sending an SRS causes a change in a time at which the SRS arrives at the base station. As a result, a UL-RTOA changes. However, in the manner of outputting a single value through filtering, the change of the UL-RTOA is smoothed out. As a result, information about the change of the UL-RTOA in a reporting periodicity is lost. In addition, if the TA changes, an error occurs in UL-RTOA reporting.

Based on this, embodiments of this application provide a measurement reporting method and apparatus. The method and the apparatus are based on a same concept. Because a problem-resolving principle of the method is similar to that of the apparatus, mutual reference may be made to implementations of the apparatus and the method. Repeated parts are not described in detail.

It should be understood that, in embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. "At least one (piece) of the following" or a similar expression thereof indicates any combination of the following, and includes any combination of one or more of the following. For example, at least one (piece) of a, b, and c may indicate a, b, c, a and b, a and c, b and c, or a, b, and c, where a, b, and c may be singular or plural.

In addition, it should be understood that in the descriptions of this application, terms such as "first" and "second" are merely used for distinguishing and description, but should not be understood as indicating or implying relative importance, or should not be understood as indicating or implying a sequence.

In embodiments of this application, a positioning device may be an LMF network element, for example, as shown in FIG. 1, or may be an LMC (which may also be referred to as a RAN-LMC) integrated into a gNB, for example, as shown in FIG. 2. The RAN-LMC corresponds to a base station, or the RAN-LMC corresponds to a positioning base station.

With reference to the accompanying drawings, the following specifically describes the measurement reporting method provided in embodiments of this application.

Embodiment 1

Figure 4:
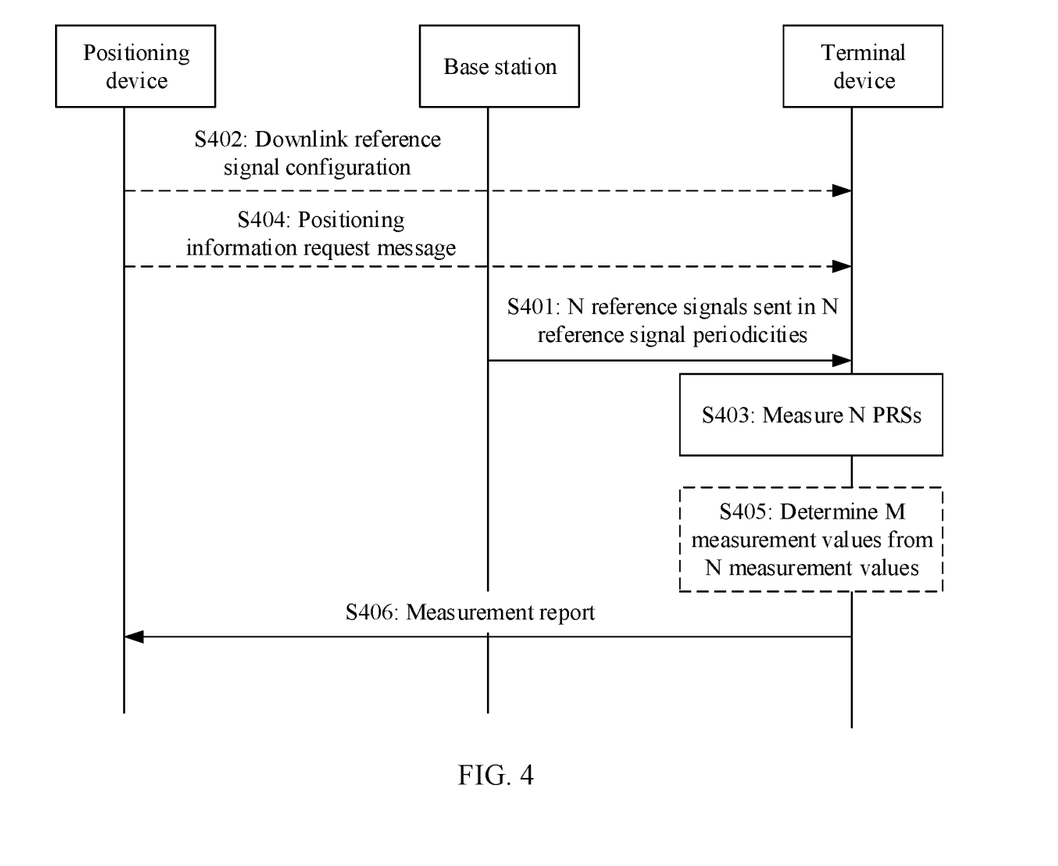
FIG. 4 is a schematic flowchart of a measurement reporting method according to this application.

Referring to FIG. 4, an embodiment of this application provides a measurement reporting method for a terminal. The following describes the method for one measurement reporting periodicity. The method includes the following steps.

S401: In a measurement reporting periodicity, the terminal receives N reference signals sent by one or more base stations in N reference signal periodicities, where N is an integer greater than 1.

It should be understood that the base station in this embodiment of this application may alternatively be a positioning base station.

For example, the reference signal may be a PRS. The following uses the PRS as an example for description.

In an example description, a PRS periodicity may be 5 ms, 10 ms, 20 ms, 40 ms, 80 ms, 160 ms, 320 ms, 640 ms, 1280 ms, or the like, and the measurement reporting periodicity may be set to 0.25 s, 0.5 s, 1 s, 2 s, 4 s, 8 s, 10 s, 16 s, 20 s, 32 s, 64 s, or the like. It may be learned that one measurement reporting periodicity includes a plurality of PRS periodicities, and N may be equal to a quantity of PRSs included in the measurement reporting periodicity. For example, when the PRS periodicity is 10 ms, and an OTDOA reporting periodicity is 0.5 s, the terminal may perform PRS measurement for 50 times in one OTDOA reporting periodicity, and N may be equal to 50.

Optionally, before step S401, step S402 may be performed.

S402: A positioning device may send, to the terminal, the downlink reference signal configuration sent by the one or more base stations. Correspondingly, the terminal may receive the downlink reference signal configuration. For example, the downlink reference signal configuration may be a PRS configuration. For example, the PRS configuration includes one or more pieces of the following information: a PRS sending periodicity, a PRS time-frequency resource, a PRS sequence, a quasi co-location (QCL), and the like.

S403: In the measurement reporting periodicity, the terminal measures N PRSs sent by the one or more base stations, to obtain N measurement values.

Each measurement value may include one or more of the following measurement quantities: a TOA, an RSTD, and a UE Rx−Tx time difference.

In an implementation, the measurement quantity included in the measurement value may be indicated by the positioning device. For example, before step 401, step S404 may be performed.

S404: The positioning device may further send a positioning information request message to the terminal. Correspondingly, the terminal may receive the positioning information request message sent by the positioning device. Optionally, the positioning information request message may include one or more of the following measurement quantities: a TOA, an RSTD, and a UE Rx−Tx time difference.

It should be noted that there is no strict execution sequence between step S402 and step S404. S404 may be performed after S402, S404 may be performed before S402, or S402 and S404 may be simultaneously performed. This is not specifically limited herein.

In another implementation, the measurement quantity may alternatively be determined through negotiation between the terminal and the positioning device. The measurement quantity determined through negotiation between the terminal and the positioning device may be one or more of a TOA, an RSTD, and a UE Rx−Tx time difference, or may be another measurement quantity.

In still another implementation, the measurement quantity may alternatively be specified in a protocol.

S405: The terminal may determine M measurement values from the N measurement values, where M may be less than or equal to N.

In a possible implementation, a value of M may be indicated by the positioning device. For example, the positioning information request message sent by the positioning device may include the value of M.

In some embodiments, the terminal may evenly select values from the N measurement values. For example, when N is equal to 100, and M is equal to 10, one measurement value may be selected every 10 PRS periodicities. Therefore, the M measurement values may include a measurement value measured in a $10^{th}$ PRS periodicity, a measurement value measured in a $20^{th}$ PRS periodicity, a measurement value measured in a $30^{th}$ PRS periodicity, . . . , and a measurement value measured in a $100^{th}$ PRS periodicity.

In some other embodiments, the terminal may alternatively divide the N measurement values into M groups, and one measurement value may be determined from each group of measurement values. For example, the filtering method shown in FIG. 3 may be used to determine one measurement value corresponding to each group of measurement values. For another example, an average value of each group of measurement values may be used as a measurement value corresponding to the group of measurement values. For still another example, a weighted sum of each group of measurement values may be used as a measurement value corresponding to the group of measurement values.

In still other embodiments, the terminal may alternatively select M consecutive measurement values from the N measurement values. For example, when N is equal to 100, and M is equal to 10, the terminal may select the last 10 measurement values, that is, a $91^{st}$ measurement value to a $100^{th}$ measurement value; or select an $85^{th}$ measurement value to a $94^{th}$ measurement value; or select a first measurement value to a $10^{th}$ measurement value; or select a $13^{th}$ measurement value to a $22^{nd}$ measurement value, or the like.

In the foregoing manner, a quantity of reported measurement values is reduced, so that system overheads of the terminal may be reduced.

In an implementation, M may be equal to N. In this manner, after obtaining the N measurement values, the terminal does not need to perform selection, that is, S405 may not be performed.

S406: The terminal reports a measurement report to the positioning device, where the measurement report includes M measurement results.

The M measurement results meet any one of the following rules:
an $i^{th}$ measurement result is an $i^{th}$ measurement value in the M measurement values; or
an $i^{th}$ measurement result is a change of an $i^{th}$ measurement value in the M measurement values relative to a first measurement value; or
an $i^{th}$ measurement result is a change of an $i^{th}$ measurement value in the M measurement values relative to an $(i-1)^{th}$ measurement value; or
an $i^{th}$ measurement result is a change of the $i^{th}$ measurement value in the M measurement values relative to an $M^{th}$ measurement value, where
i is greater than 1 and less than or equal to M.

For example, for RSTD reporting, the M measurement results may include RSTD values measured for a neighboring cell. Specifically, the M measurement results may include one or more pieces of the following information:
R(i), where i=1, 2, 3, 4, . . . , or M;
$R_1$(i), where when i=1, $R_1$(1)=R(1), and when i=2, 3, 4, . . . , or M, $R_1$(i)=R(i)−R(1);
$R_2$(i), where when i=1, $R_2$(1)=R(1), and when i=2, 3, 4, . . . , or M, $R_2$(i)=R(i)−R(i−1); and
$R_3$(i), where when i=M, $R_3$(M)=R(M), and when i=1, 2, 3, 4, . . . , or M−1, $R_3$(i)=R(i)−R(M).

R(i) is an RSTD value included in the $i^{th}$ measurement value in the M measurement values.

For example, it is assumed that N is equal to 10, and M is equal to 5. The five measurement results may be respectively a measurement value measured in a first PRS periodicity, a measurement value measured in a third PRS periodicity, a measurement value measured in a fifth PRS periodicity, a measurement value measured in a seventh PRS periodicity; and a measurement value measured in a ninth PRS periodicity. Therefore, the M measurement results may include one or more pieces of the following information:
an RSTD value measured in the first PRS periodicity, an RSTD value measured in the third PRS periodicity, an RSTD value measured in the fifth PRS periodicity, an RSTD value measured in the seventh PRS periodicity, and an RSTD value measured in the ninth PRS periodicity;
an RSTD value measured in the first PRS periodicity, a change of an RSTD value measured in the third PRS periodicity relative to the RSTD value measured in the first PRS periodicity, a change of an RSTD value measured in the fifth PRS periodicity relative to the RSTD value measured in the first PRS periodicity, a change of an RSTD value measured in the seventh PRS periodicity relative to the RSTD value measured in the first PRS periodicity, and a change of an RSTD value measured in the ninth PRS periodicity relative to the RSTD value measured in the first PRS periodicity;
an RSTD value measured in the first PRS periodicity, a change of an RSTD value measured in the third PRS periodicity relative to the RSTD value measured in the first PRS periodicity, a change of an RSTD value measured in the fifth PRS periodicity relative to the RSTD value measured in the third PRS periodicity, a change of an RSTD value measured in the seventh PRS periodicity relative to the RSTD value measured in the fifth PRS periodicity, and a change of an RSTD value measured in the ninth PRS periodicity relative to the RSTD value measured in the seventh PRS periodicity; and
an RSTD value measured in the ninth PRS periodicity, a change of an RSTD value measured in the first PRS periodicity relative to the RSTD value measured in the ninth PRS periodicity, a change of an RSTD value measured in the third PRS periodicity relative to the RSTD value measured in the ninth PRS periodicity, a change of an RSTD value measured in the fifth PRS periodicity relative to the RSTD value measured in the ninth PRS periodicity, and a change of an RSTD value measured in the seventh PRS periodicity relative to the RSTD value measured in the ninth PRS periodicity.

When M is equal to N. R(i) may also be understood as an RSTD measured in an $i^{th}$ PRS periodicity. In this implementation, the measurement report may include one or more pieces of the following information: an RSTD value measured in each PRS periodicity; a change of an RSTD value measured in each PRS periodicity relative to an RSTD value measured in a first PRS periodicity, where for the first PRS periodicity, the RSTD value measured in the first PRS periodicity may be determined as a change; a change of an RSTD value measured in each PRS periodicity relative to an RSTD value measured in a previous PRS periodicity, where for a first PRS periodicity, an RSTD value measured in the first PRS periodicity may be determined as a change; and a change of an RSTD value measured in each PRS periodicity relative to an RSTD value measured in the last PRS periodicity, where for the last PRS periodicity, the RSTD value measured in the last PRS periodicity may be determined as a change.

For example, it is assumed that N=M=5. The M measurement results may include one or more pieces of the following information:
an RSTD value measured in a first PRS periodicity, an RSTD value measured in a second PRS periodicity, an RSTD value measured in a third PRS periodicity, an RSTD value measured in a fourth PRS periodicity, and an RSTD value measured in a fifth PRS periodicity;
an RSTD value measured in a first PRS periodicity, a change of an RSTD value measured in a second PRS periodicity relative to the RSTD value measured in the first PRS periodicity, a change of an RSTD value measured in a third PRS periodicity relative to the RSTD value measured in the first PRS periodicity, a change of an RSTD value measured in a fourth PRS periodicity relative to the RSTD value measured in the first PRS periodicity, and a change of an RSTD value measured in a fifth PRS periodicity relative to the RSTD value measured in the first PRS periodicity;
an RSTD value measured in a first PRS periodicity, a change of an RSTD value measured in a second PRS periodicity relative to the RSTD value measured in the first PRS periodicity, a change of an RSTD value measured in a third PRS periodicity relative to the RSTD value measured in the second PRS periodicity, a change of an RSTD value measured in a fourth PRS periodicity relative to the RSTD value measured in the third PRS periodicity, and a change of an RSTD value measured in a fifth PRS periodicity relative to the RSTD value measured in the fourth PRS periodicity; and
an RSTD value measured in a fifth PRS periodicity, a change of an RSTD value measured in a first PRS periodicity relative to the RSTD value measured in the fifth PRS periodicity, a change of an RSTD value measured in a second PRS periodicity relative to the RSTD value measured in the fifth PRS periodicity, a change of an RSTD value measured in a third PRS periodicity relative to the RSTD value measured in the fifth PRS periodicity, and a change of an RSTD value measured in a fourth PRS periodicity relative to the RSTD value measured in the fifth PRS periodicity.

For example, the M measurement results may further include TOA values measured for a reference cell. Specifically, the M measurement results may further include one or more pieces of the following information:

$T_1(i)$, where when i=1, $T_1(1)=T(1)$, and when i=2, 3, 4, . . . , or M, $T_1(i)=T(i)-T(1)$;

$T_2(i)$, where when i=1, $T_2(1)=T(1)$, and when i=2, 3, 4, . . . , or M, $T_2(i)=T(i)-T(i-1)$; and $T_3(i)$, where when i=M, $T_3(M)=T(M)$, and when i=1, 2, 3, 4, . . . , or M−1, $T_3(i)=T(i)-T(M)$.

T(i) is a TOA value included in the $i^{th}$ measurement value in the M measurement values. When M is equal to N, T(i) may also be understood as a TOA value measured in an $i^{th}$ PRS periodicity.

For example, N is equal to 10, and M is equal to 5. The M measurement results may further include one or more pieces of the following information:

a TOA value measured in a first PRS periodicity, a change of a TOA value measured in a third PRS periodicity relative to the TOA value measured in the first PRS periodicity, a change of a TOA value measured in a fifth PRS periodicity relative to the TOA value measured in the first PRS periodicity, a change of a TOA value measured in a seventh PRS periodicity relative to the TOA value measured in the first PRS periodicity, and a change of a TOA value measured in a ninth PRS periodicity relative to the TOA value measured in the first PRS periodicity;

a TOA value measured in a first PRS periodicity, a change of a TOA value measured in a third PRS periodicity relative to the TOA value measured in the first PRS periodicity, a change of a TOA value measured in a fifth PRS periodicity relative to the TOA value measured in the third PRS periodicity, a change of a TOA value measured in a seventh PRS periodicity relative to the TOA value measured in the fifth PRS periodicity, and a change of a TOA value measured in a ninth PRS periodicity relative to the TOA value measured in the seventh PRS periodicity; and a TOA value measured in a ninth PRS periodicity, a change of a TOA value measured in a first PRS periodicity relative to the TOA value measured in the ninth PRS periodicity, a change of a TOA value measured in a third PRS periodicity relative to the TOA value measured in the ninth PRS periodicity, a change of a TOA value measured in a fifth PRS periodicity relative to the TOA value measured in the ninth PRS periodicity, and a change of a TOA value measured in a seventh PRS periodicity relative to the TOA value measured in the ninth PRS periodicity.

For reporting of a UE Rx−Tx time difference, the M measurement results may include UE Rx−Tx time difference values measured for each cell. Specifically, the M measurement results may include one or more pieces of the following information:

D(i), where i=1, 2, 3, 4, . . . , or M;

$D_1(i)$, where when i=1, $D_1(1)=D(1)$, and when i=2, 3, 4, . . . , or M, $D_1(i)=D(i)-D(1)$;

$D_2(i)$, where when i=1, $D_2(1)=D(1)$, and when i=2, 3, 4, . . . , or M, $D_2(i)=D(i)-D(i-1)$; and $D_3(i)$, where when i=M, $D_3(M)=D(M)$, and when i=1, 2, 3, 4, . . . , or M−1, $D_3(i)=D(i)-D(M)$.

D(i) is a UE Rx−Tx time difference value included in the $i^{th}$ measurement value in the M measurement values.

A reporting manner of the UE Rx−Tx time difference is similar to the reporting manner of the RSTD, and similarities are not described herein.

In an implementation, the M measurement results may further include N timestamps of the N PRSs received by the terminal.

For example, types of the timestamps may be sequence numbers of the PRS periodicities; or SFNs corresponding to the PRS periodicities; or SFNs corresponding to the PRS periodicities and subframe numbers of subframes in which the PRSs are located; or SFNs corresponding to the PRS periodicities and timeslot numbers of timeslots in which the PRSs are located.

In some embodiments, the timestamps may be indicated by the positioning device. For example, the positioning information request message sent by the positioning device may include the types of the timestamps.

In a possible implementation, the positioning information request message may indicate a timestamp type for each time of measurement.

In some other embodiments, the types of the timestamps may alternatively be negotiated between the terminal and the positioning device.

In still other embodiments, the types of the timestamps may alternatively be specified in a protocol.

In a possible implementation, each measurement result may correspond to one timestamp, or each piece of information included in each measurement result may correspond to one timestamp. An example in which the $i^{th}$ measurement result includes R(i), $T_1(i)$, and $D_2(i)$ is used for description. The $i^{th}$ measurement result may correspond to one timestamp, or R(i), $T_1(i)$, and $D_2(i)$ each correspond to one timestamp.

Further, when R(i), $T_1(i)$, and $D_2(i)$ each correspond to one timestamp, a timestamp of R(i) may be reported together with R(i), a timestamp of $T_1(i)$ may be reported together with $T_1(i)$, and a timestamp of $D_2(i)$ may be reported together with $D_2(i)$.

In the foregoing manner, the timestamps are reported, so that the positioning device can estimate a speed of the terminal, thereby more accurately obtaining position information of the terminal.

In this embodiment of this application, the terminal adds a plurality of measurement values to a single report, so that the positioning device can determine a measurement value change status in a reporting periodicity, thereby improving accuracy of terminal positioning.

Optionally, the terminal may further report a timestamp to the positioning device, and a plurality of measurement results and timestamps are carried in a single report, so that the positioning device can track movement of the terminal, to implement positioning effects such as terminal speed prediction and track construction.

Figure 5:
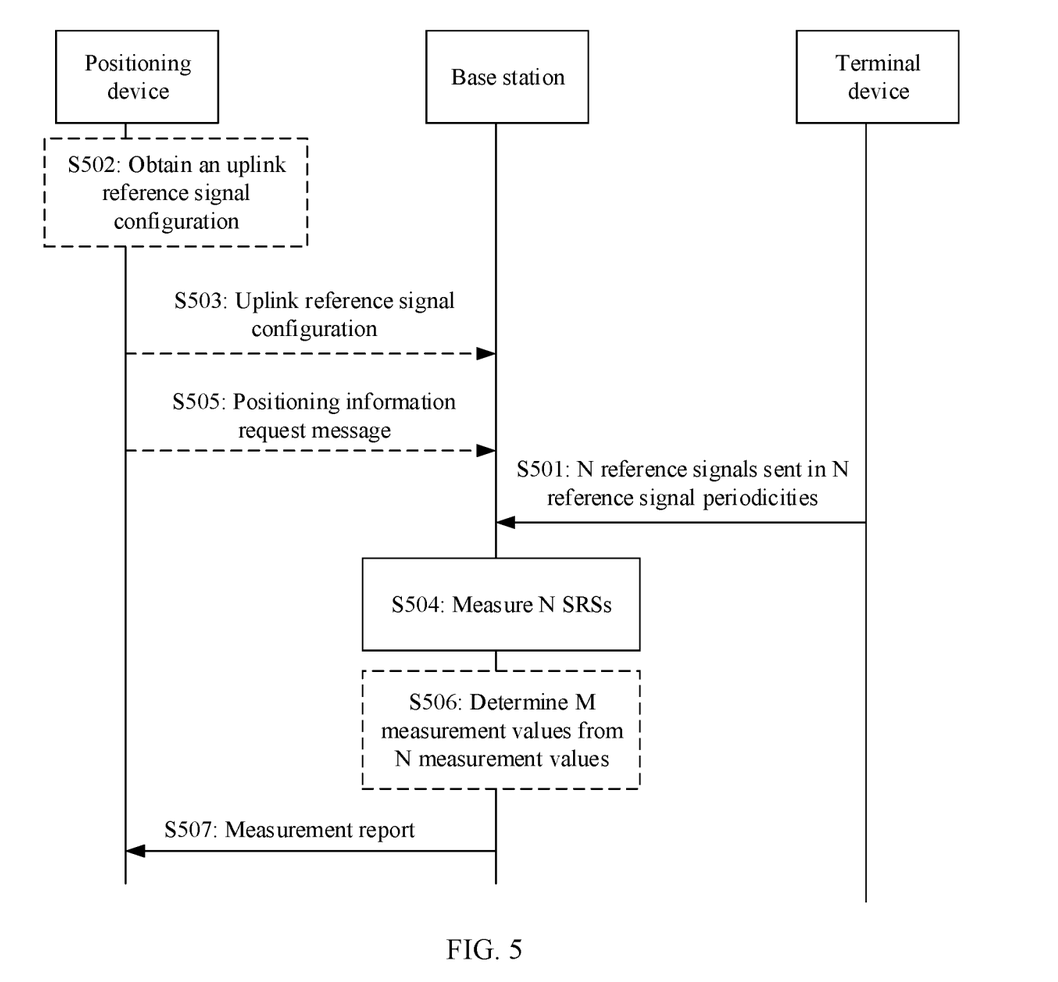
FIG. 5 is a schematic flowchart of another measurement reporting method according to this application.

Referring to FIG. 5, an embodiment of this application provides a measurement reporting method for a network device. The following describes the method for one measurement reporting periodicity. The method includes the following steps.

S501: In a measurement reporting periodicity, a base station receives N reference signals sent by a terminal in N reference signal periodicities, where N is an integer greater than 1.

It should be understood that the base station in this embodiment of this application may alternatively be a positioning base station.

For example, the reference signal may be an SRS. The following uses the SRS as an example for description.

In an example description, an SRS periodicity may be 2 ms, 5 ms, 10 ms, 20 ms, 40 ms, 80 ms, 160 ms, 320 ms, or the like. Based on configured SRS bandwidth, it may be determined that a measurement report is reported once every N SRS periodicities. The N SRS periodicities may be considered as one measurement reporting periodicity. For example, as shown in Table 1, when the SRS bandwidth is 60 RBs, an LMU needs to obtain a UL-RTOA with required precision of 6 Ts every five times of measurement. That is, a measurement report is reported once every five SRS periodicities.

In an implementation, before step S501, steps S502 and S503 may be performed.

S502: A positioning device obtains an uplink reference signal configuration of the terminal.

The positioning device may obtain the uplink reference signal configuration of the terminal by using a serving base station of the terminal, or may obtain the uplink reference signal configuration of the terminal reported by the terminal.

S503: The positioning device sends the uplink reference signal configuration of the terminal to the base station. For example, the uplink reference signal configuration includes one or more pieces of the following information: an SRS periodicity, an SRS time-frequency resource, a sequence, spatial relationship information, a power control parameter, and the like.

S504: In the measurement reporting periodicity, the base station measures N SRSs sent by the terminal, to obtain N measurement values.

Each measurement value may correspond to one or more of the following measurement quantities: a UL-RTOA, a gNB Rx–Tx time difference, and an AoA/ZoA.

In an implementation, the measurement quantity corresponding to the measurement value may be indicated by the positioning device. For example, before step 501, step S505 may be performed.

S505: The positioning device may further send a positioning information request message to the base station. Correspondingly, the base station may receive the positioning information request message sent by the positioning device. Optionally, the positioning information request message may include one or more of the following measurement quantities: a UL-RTOA, a gNB Rx–Tx time difference, and an AoA/ZoA.

It should be noted that there is no strict execution sequence between step S503 and step S505. S505 may be performed after S503, S505 may be performed before S503, or S503 and S505 may be simultaneously performed. This is not specifically limited herein.

In another implementation, the measurement quantity may alternatively be determined through negotiation between the base station and the positioning device.

In still another implementation, the measurement quantity may alternatively be specified in a protocol.

S506: The base station may determine M measurement values from the N measurement values, where M may be less than or equal to N.

In a possible implementation, a value of M may be indicated by the positioning device. For example, the positioning information request message sent by the positioning device may include the value of M.

A method for determining the M measurement values from the N measurement values by the base station is similar to the method for determining the M measurement values from the N measurement values by the terminal in Embodiment 1. For details, refer to the foregoing description. Details are not described herein.

In the foregoing manner, a quantity of reported measurement values is reduced, so that system overheads of the base station may be reduced.

In an implementation, M may be equal to N. In this manner, after obtaining the N measurement values, the base station does not need to perform selection, that is, S506 may not be performed.

S507: The base station reports a measurement report to the positioning device, where the measurement report includes M measurement results.

Optionally, the M measurement results meet any one of the following rules:

an $i^{th}$ measurement result is an $i^{th}$ measurement value in the M measurement values; or an $i^{th}$ measurement result is a change of an $i^{th}$ measurement value in the M measurement values relative to a first measurement value; or an $i^{th}$ measurement result is a change of an $i^{th}$ measurement value in the M measurement values relative to an $(i-1)^{th}$ measurement value; or an $i^{th}$ measurement result is a change of the $i^{th}$ measurement value in the M measurement values relative to an $M^{th}$ measurement value, where i is greater than 1 and less than or equal to M.

For reporting of the UL-RTOA/gNB Rx–Tx time difference/AoA/ZoA, compared with the foregoing embodiment, other reporting rules are the same except that the measurement quantities are different. For details, refer to the reporting of the UE Rx–Tx time difference in Embodiment 1. Details are not described herein.

In an implementation, the M measurement results may further include N timestamps of the N SRSs received by the base station.

For details about types and a reporting method of the timestamps, refer to the related description of the timestamps in Embodiment 1. Details are not described herein.

In some embodiments, the types of the timestamps may be indicated by the positioning device. For example, the positioning information request message sent by the positioning device may include the types of the timestamps.

In some other embodiments, the types of the timestamps may alternatively be negotiated between the base station and the positioning device.

In still other embodiments, the types of the timestamps may alternatively be specified in a protocol.

In this embodiment of this application, the base station adds a plurality of measurement results to a single report, so that the positioning device can determine a measurement value change status in a reporting periodicity, thereby improving accuracy of terminal positioning.

In addition, the base station may further report a timestamp to the positioning device, and a plurality of measurement results and timestamps are carried in a single report, so that the positioning device can track movement of the terminal, to implement positioning effects such as terminal speed prediction and track construction.

Based on a same inventive concept as the method embodiment, an embodiment of this application provides a measurement reporting apparatus. The measurement reporting apparatus may be specifically configured to implement the method performed by the terminal in the embodiment of FIG. 4 or the method performed by the base station in the embodiment of FIG. 5. The apparatus may be a communication device, or may be a chip or a chip set in a communication device, or a part that is in a chip and that is configured to perform a function of a related method. The communication device may be the terminal in the embodiment of FIG. 4, or may be the base station in the embodiment of FIG. 5.

Figure 6:
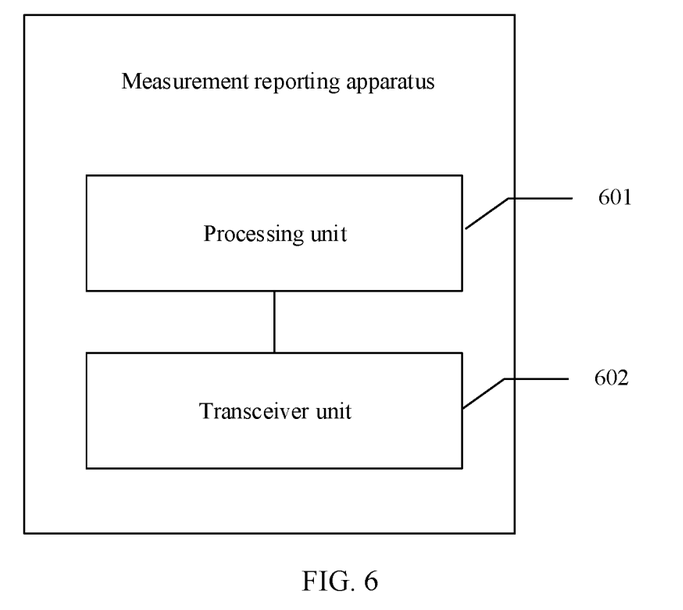
FIG. 6 is a schematic diagram of a structure of a measurement reporting apparatus according to this application.

A structure of the measurement reporting apparatus may be shown in FIG. 6, and includes a processing unit 601 and a transceiver unit 602. The transceiver unit 602 is configured to receive, in a measurement reporting periodicity, N reference signals sent by a communication device in N reference signal periodicities, where N is an integer greater than 1. The processing unit 601 is configured to measure, in the measurement reporting periodicity, the N reference signals received by the transceiver unit 602, to obtain M measurement values, where M is less than or equal to N. The transceiver unit 602 is further configured to report a measurement report to a positioning device, where the measurement report includes M measurement results.

In an implementation, the transceiver unit 602 may be further configured to receive a positioning information request message. The positioning information request message may include one or more of the following measurement quantities: a TOA, an RSTD, a UE Rx–Tx time difference: or the positioning information request message may include one or more of the following measurement quantities: a UL-RTOA, a gNB Rx–Tx time difference, and an AoA/ZoA.

For example, the positioning information request message may further include a value of M.

For example, an $i^{th}$ measurement result may be an $i^{th}$ measurement value in the M measurement values; or
- an $i^{th}$ measurement result may be a change of an $i^{th}$ measurement value in the M measurement values relative to a first measurement value; or
- an $i^{th}$ measurement result may be a change of an $i^{th}$ measurement value in the M measurement values relative to an $(i-1)^{th}$ measurement value; or
- an $i^{th}$ measurement result may be a change of an $i^{th}$ measurement value in the M measurement values relative to an $M^{th}$ measurement value, where
- i is greater than 1 and less than or equal to M.

In addition, the measurement report may further include N timestamps of the N reference signals received by the transceiver unit 602.

The timestamps may be in one of the following types: sequence numbers of the reference signal periodicities; SFNs corresponding to the reference signal periodicities; SFNs corresponding to the reference signal periodicities and subframe numbers of subframes in which the reference signals are located; or SFNs corresponding to the reference signal periodicities and timeslot numbers of timeslots in which the reference signals are located.

In embodiments of this application, division into modules is an example, and is merely logical function division, and may be other division during actual implementation. In addition, function modules in embodiments of this application may be integrated into one processor, or each of the modules may exist alone physically, or two or more modules may be integrated into one module. The integrated module may be implemented in a form of hardware, or may be implemented in a form of a software function module. It may be understood that, for functions or implementations of the modules in embodiments of this application, further refer to related descriptions in method embodiments.

Figure 7:
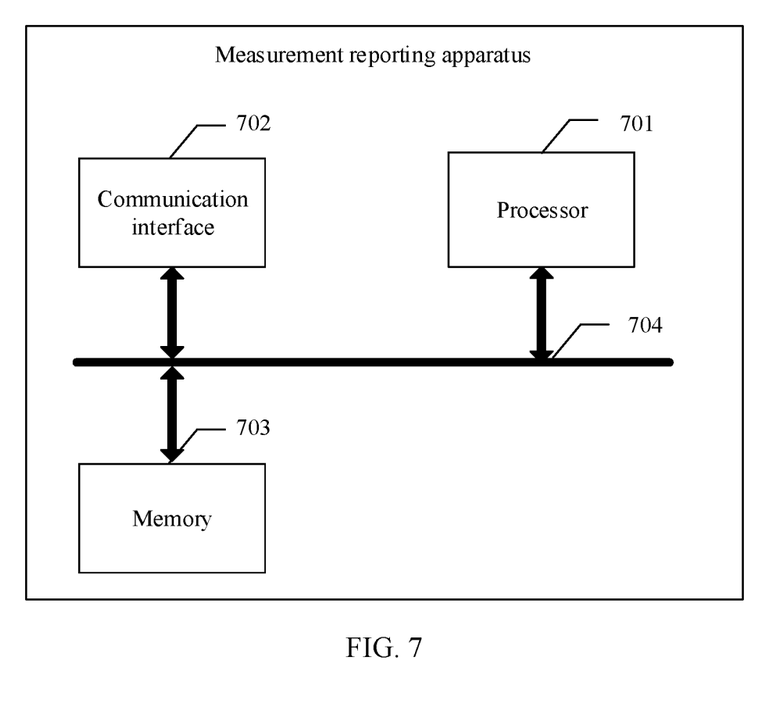
FIG. 7 is a schematic diagram of a structure of another measurement reporting apparatus according to this application.

In a possible manner, the measurement reporting apparatus may be shown in FIG. 7, and the apparatus may be a communication device or a chip in a communication device. The apparatus may include a processor 701, a communication interface 702, and a memory 703. The processing unit 601 may be the processor 701. The transceiver unit 602 may be the communication interface 702.

The processor 701 may be a central processing unit (CPU), a digital processing unit, or the like. The communication interface 702 may be a transceiver, an interface circuit such as a transceiver circuit, a transceiver chip, or the like. The apparatus further includes a memory 703, configured to store a program executed by the processor 701. The memory 703 may be a nonvolatile memory, for example, a hard disk drive (HDD) or a solid-state drive (SSD), or may be a volatile memory, for example, a random-access memory (RAM). The memory 703 is any other medium that can be configured to carry or store expected program code that has instructions or a data structure form and that can be accessed by a computer, but is not limited thereto.

The processor 701 is configured to execute the program code stored in the memory 703, and is specifically configured to perform an action of the processing unit 601. Details are not described herein in this application. The communication interface 702 is specifically configured to perform an action of the transceiver unit 602. Details are not described herein in this application.

This embodiment of this application does not limit a specific connection medium between the communication interface 702, the processor 701, and the memory 703. In this embodiment of this application, in FIG. 7, the memory 703, the processor 701, and the communication interface 702 are connected by using a bus 704. The bus is represented by using a thick line in FIG. 7. A manner for connecting other components is only used as an example for description, and this embodiment is not limited thereto. The bus may be classified into an address bus, a data bus, a control bus, and the like. For ease of representation, only one thick line is used to represent the bus in FIG. 7, but this does not mean that there is only one bus or only one type of bus.

An embodiment of the present disclosure further provides a computer-readable storage medium, configured to store computer software instructions that need to be executed for execution of the foregoing processor, and the computer-readable storage medium includes a program that needs to be executed for execution of the foregoing processor.

All or some of the foregoing embodiments may be implemented by using software, hardware, firmware, or any combination thereof. When software is used for implementation, all or some of the foregoing embodiments may be implemented in a form of a computer program product. The computer program product includes one or more computer instructions. When the computer program instructions are loaded and executed on a computer, all or some of the procedures or the functions according to embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of procedures and/or blocks in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the spirit and scope of this application. In this way, this application is intended to cover these modifications and variations of this application provided that they fall within the scope of protection defined by the following claims and their equivalent technologies.

What is claimed is:

1. A measurement reporting method, the method comprising:
   receiving, by a first communication device in a measurement reporting periodicity, N reference signals from a second communication device in N reference signal periodicities, wherein N is an integer greater than 1;
   measuring, by the first communication device, the N reference signals in the measurement reporting periodicity, to obtain M measurement values, wherein M is less than or equal to N; and
   reporting, by the first communication device, a measurement report to a positioning device, wherein the measurement report comprises the M measurement values.

2. The method according to claim 1, further comprising:
   receiving, by the first communication device, a positioning information request message,
   wherein the positioning information request message comprises one or more of the following measurement quantities: a time of arrival (TOA), a reference signal time difference (RSTD), or a terminal reference signal receive–reference signal transmit time difference (UE Rx–Tx time difference).

3. The method according to claim 2, wherein the positioning information request message comprises a value of M.

4. The method according to claim 1, wherein
   an $i^{th}$ measurement result is an $i^{th}$ measurement value in the M measurement values; or
   an $i^{th}$ measurement result is a change of an $i^{th}$ measurement value in the M measurement values relative to a first measurement value; or
   an $i^{th}$ measurement result is a change of an $i^{th}$ measurement value in the M measurement values relative to an $(i-1)^{th}$ measurement value; or
   an $i^{th}$ measurement result is a change of an $i^{th}$ measurement value in the M measurement values relative to an $M^{th}$ measurement value,
   wherein i is greater than 1 and less than or equal to M.

5. The method according to claim 4, wherein the measurement report further comprises:
   N timestamps of the N reference signals received by the first communication device.

6. The method according to claim 5, wherein the timestamps are in one of the following types:
   sequence numbers of the N reference signal periodicities; or
   system frame numbers (SFNs) corresponding to the N reference signal periodicities; or
   SFNs corresponding to the N reference signal periodicities and subframe numbers of subframes in which the N reference signals are located; or
   SFNs corresponding to the N reference signal periodicities and timeslot numbers of timeslots in which the N reference signals are located.

7. A measurement reporting apparatus, the apparatus comprising:
   a transceiver, configured to receive, in a measurement reporting periodicity, N reference signals from a communication device in N reference signal periodicities, wherein N is an integer greater than 1; and
   a processor, configured to measure, in the measurement reporting periodicity, the N reference signals received by the transceiver, to obtain M measurement values, wherein M is less than or equal to N,
   wherein the transceiver is further configured to report a measurement report to a positioning device, wherein the measurement report comprises the M measurement values.

8. The apparatus according to claim 7, wherein the transceiver is further configured to:
   receive a positioning information request message,
   wherein the positioning information request message comprises one or more of the following measurement quantities: a time of arrival (TOA), a reference signal time difference (RSTD), or a terminal reference signal receive–reference signal transmit time difference (UE Rx–Tx time difference).

9. The apparatus according to claim 8, wherein the positioning information request message comprises a value of M.

10. The apparatus according to claim 7, wherein
an $i^{th}$ measurement result is an $i^{th}$ measurement value in the M measurement values; or
an $i^{th}$ measurement result is a change of an $i^{th}$ measurement value in the M measurement values relative to a first measurement value; or
an $i^{th}$ measurement result is a change of an $i^{th}$ measurement value in the M measurement values relative to an $(i-1)^{th}$ measurement value; or
an $i^{th}$ measurement result is a change of the $i^{th}$ measurement value in the M measurement values relative to an $M^{th}$ measurement value,
wherein i is greater than 1 and less than or equal to M.

11. The apparatus according to claim 10, wherein the measurement report further comprises:
N timestamps of the N reference signals received by the transceiver.

12. The apparatus according to claim 11, wherein the timestamps are in one of the following types:
sequence numbers of the N reference signal periodicities; or
system frame numbers (SFNs) corresponding to the N reference signal periodicities; or
SFNs corresponding to the N reference signal periodicities and subframe numbers of subframes in which the N reference signals are located; or
SFNs corresponding to the N reference signal periodicities and timeslot numbers of timeslots in which the N reference signals are located.

13. The apparatus according to claim 7, wherein the transceiver is further configured to:
receive a positioning information request message,
wherein the positioning information request message comprises one or more of the following measurement quantities: an uplink relative time of arrival (UL-RTOA), a base station reference signal receive–reference signal transmit time difference (gNB Rx–Tx time difference), or an azimuth/zenith angle of arrival (AoA/ZoA).

14. A non-transitory computer-readable storage medium, wherein the computer-readable storage medium stores a program or instructions, and the program or the instructions are read and executed by one or more processors to implement the method of:
receiving, by a first communication device in a measurement reporting periodicity, N reference signals from a second communication device in N reference signal periodicities, wherein N is an integer greater than 1;
measuring, by the first communication device, the N reference signals in the measurement reporting periodicity, to obtain M measurement values, wherein M is less than or equal to N; and
reporting, by the first communication device, a measurement report to a positioning device, wherein the measurement report comprises the M measurement values.

15. The non-transitory computer storage medium according to claim 14, wherein the method further comprises:
receiving, by the first communication device, a positioning information request message, wherein the positioning information request message comprises one or more of the following measurement quantities:
a time of arrival (TOA), a reference signal time difference (RSTD), a terminal reference signal receive–reference signal transmit time difference (UE Rx–Tx time difference), an uplink relative time of arrival (UL-RTOA), a base station reference signal receive–reference signal transmit time difference (gNB Rx–Tx time difference), or an azimuth/zenith angle of arrival (AoA/ZoA).

16. The non-transitory computer storage medium according to claim 15, wherein the positioning information request message comprises a value of M.

17. The non-transitory computer storage medium according to claim 14, wherein
an $i^{th}$ measurement result is an $i^{th}$ measurement value in the M measurement values; or
an $i^{th}$ measurement result is a change of an $i^{th}$ measurement value in the M measurement values relative to a first measurement value; or
an $i^{th}$ measurement result is a change of an $i^{th}$ measurement value in the M measurement values relative to an $(i-1)^{th}$ measurement value; or
an $i^{th}$ measurement result is a change of an $i^{th}$ measurement value in the M measurement values relative to an $M^{th}$ measurement value,
wherein i is greater than 1 and less than or equal to M.

18. The non-transitory computer storage medium according to claim 17, wherein the measurement report further comprises:
N timestamps of the N reference signals received by the first communication device.

19. The non-transitory computer storage medium according to claim 18, wherein the timestamps are in one of the following types:
sequence numbers of the N reference signal periodicities; or
system frame numbers (SFNs) corresponding to the N reference signal periodicities; or
SFNs corresponding to the N reference signal periodicities and subframe numbers of subframes in which the N reference signals are located; or
SFNs corresponding to the N reference signal periodicities and timeslot numbers of timeslots in which the N reference signals are located.

20. The method according to claim 1, further comprising:
receiving, by the first communication device, a positioning information request message,
wherein the positioning information request message comprises one or more of the following measurement quantities: an uplink relative time of arrival (UL-RTOA), a base station reference signal receive–reference signal transmit time difference (gNB Rx–Tx time difference), or an azimuth/zenith angle of arrival (AoA/ZoA).

* * * * *